United States Patent [19]

Wind

[11] 4,113,137
[45] Sep. 12, 1978

[54] CAMERA HOUSING OPTICAL SEALING METHOD AND DEVICE

[75] Inventor: Walter Jamison Wind, San Diego, Calif.

[73] Assignee: Cohu, Inc., San Diego, Calif.

[21] Appl. No.: 835,242

[22] Filed: Sep. 21, 1977

[51] Int. Cl.² .................... B65D 45/32; B65D 25/54; B65D 53/00

[52] U.S. Cl. ................. 220/319; 220/82 R; 220/378; 277/188 R

[58] Field of Search ............... 220/319, 315, 378, 361, 220/3, 82 R, 82 A, 307, 308, 366; 277/188 R, 189; 285/DIG. 18, DIG. 19

[56] References Cited

U.S. PATENT DOCUMENTS

| | | | |
|---|---|---|---|
| 2,215,566 | 9/1940 | Schaaf, Jr. | 220/82 R |
| 2,790,462 | 4/1957 | Ashton | 220/319 X |
| 3,132,764 | 5/1964 | Hutton, Jr. | 220/315 |
| 3,381,970 | 5/1968 | Brown | 277/188 R X |

Primary Examiner—William Price
Assistant Examiner—Steven M. Pollard
Attorney, Agent, or Firm—Brown & Martin

[57] ABSTRACT

A new and improved device and method for hermetically sealing a lens window to a camera housing, which permits removal of the window from a pressurized housing without danger to the technician due to rapid or explosive decompression. The device comprises a unique combination of an O-ring seal and a square or rectangular cross-section face seal ring with two snaprings in such a manner that removal of the first snapring causes controlled decompression of the housing, while the lens window is retained by the second snapring.

9 Claims, 6 Drawing Figures

CAMERA HOUSING OPTICAL SEALING METHOD AND DEVICE

BACKGROUND OF THE INVENTION

The invention relates to camera housings and more specifically to the optical sealing of pressurized or hermetically sealed housings.

As the use of photographic and television cameras has expanded, including underwater monitoring, the need to protect the delicate elements of the camera from adverse environments of heat, cold, dust, and moisture has likewise increased. For many of these uses there have been provided rugged hermetically sealed camera housings, and for more hostile environments these housings are purged with a desiccated gas and pressurized above the outside environmental pressure so that any small amount of leakage will be from inside the housing to the outside environment, thus preventing ingestion of elements of the environment into the delicate camera mechanism.

In the case of camera housings which are hermetically sealed at atmospheric pressure there may be developed a positive internal pressure due to a reduced external pressure, such as caused by carrying the camera to a higher altitude. Additionally, an internal temperature rise will cause a concomitant pressure rise.

When for what ever reason positive internal pressure exists, there is a potential danger to the technician attempting to disassemble the housing wherein a sudden or explosive expansion or decompression may be triggered by removal of a retaining element such as a screw or snap-ring. To prevent such a possibility most camera housings are provided with a bleed valve which the technician should operate to bleed off any internal pressure. Because the bleed off procedure reduces the internal pressure until it approaches the outside pressure asymptotically, the technician may not detect the reduced but continued escaping gas flow and turn off the bleed valve too soon, thus leaving a residual internal pressure. Also the internal pressure is reduced isothermally, and after the bleed valve is turned off internal temperature stabilization may cause a residual internal pressure to be created.

Of even greater danger is the possibility of the technician forgetting to actuate the bleed valve. This is particularly a possibility in the case of a camera housing which has been sealed at atmospheric pressure and is therefor in the technician's view "unpressurized". However, as previously described such housings may very well contain a positive internal pressure.

Thus, because of the above and other reasons, difficulties have continued to exist in the opening of hermetically sealed camera housings for conducting normal maintenance on the camera elements contained therein.

SUMMARY OF THE INVENTION

It is an object of this invention to provide a new and improved device and method for opening a hermetically sealed camera housing that overcomes the above described problems by eliminating physical danger to the technician that an explosive decompression might otherwise cause.

To open a camera housing comprising the hereinafter described sealing device requires the removal of a first snap-ring which retains the camera lens window. The lens window is hermetically sealed to the camera housing by means of an O-ring cylinder seal and a second square cross-sectioned ring seal that acts as a face seal on the window. If the camera housing is internally pressurized when the first snap-ring is removed the internal pressure will move the lens window forward in the housing a short distance allowing the lens window to contact a second snap-ring which retains the window and prevents further movement. By means of this small forward movement the window unseats the square face seal and provides an escape passage for the pressurized internal gas.

Thus, by retaining the window and other sealing elements with a second snap-ring, the danger of any loose parts striking the technician during decompression has been eliminated. This is accomplished by a new and improved sealing device and method of unsealing the camera housing which will hereinafter be described in greater detail.

BRIEF DESCRIPTION OF THE DRAWINGS

The advantages of the present invention reside in the construction and cooperation of elements and the method for removing them as hereinafter described, reference being made to the accompanying drawings which show the preferred embodiment of the invention, wherein.

DETAILED DESCRIPTION OF THE INVENTION

Figure 3:
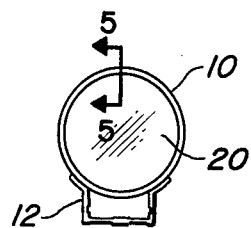
FIG. 3 is a front end view of the housing of FIG. 1.
Figure 1:
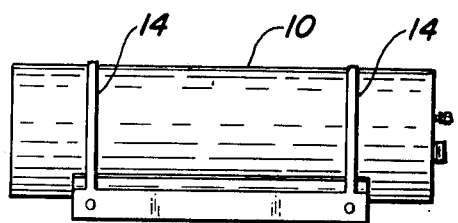
FIG. 1 is a side elevation view of a typical camera housing.
Figure 2:
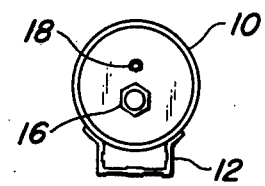
FIG. 2 is a rear end view of the housing of FIG. 1.

Referring now to the drawings in detail, FIGS. 1, 2, and 3 are views of a typical television camera housing such as the type used for unattended continuous-duty television monitoring in stores, airports, parking lots, factories, waterways and locks, tunnels, bridges, and other traffic areas. The environment-resistant cylindrical housing 10 is strapped to a cradle base 12 by means of two straps 14. Both the housing 10 and mounting provisions 12 and 14 are made of a corrosion-resistant material such as for example, stainless steel, aluminum, or brass and finished on the outside with an appropriate highly visible color, heat-reflecting, or weather-resistant finish, or may be finished to blend with the environment such as for example blue-green color for underwater use.

The rear end of the housing 10, best seen in FIG. 2, mounts a multiconductor cable connector 16 and a combination purge, fill, and bleed valve 18, which allows the camera interior to be purged with dry gas, such as for example nitrogen or air, and thereafter pressurized to approximately 5–10 psi above the outside pressure, or maintained at atmospheric pressure. The front end of the cylindrical housing 10 is covered by a transparent non-reflecting lens window 20. For certain specialized applications the lens window 20 may also serve the function of an optical filter.

Figure 4:
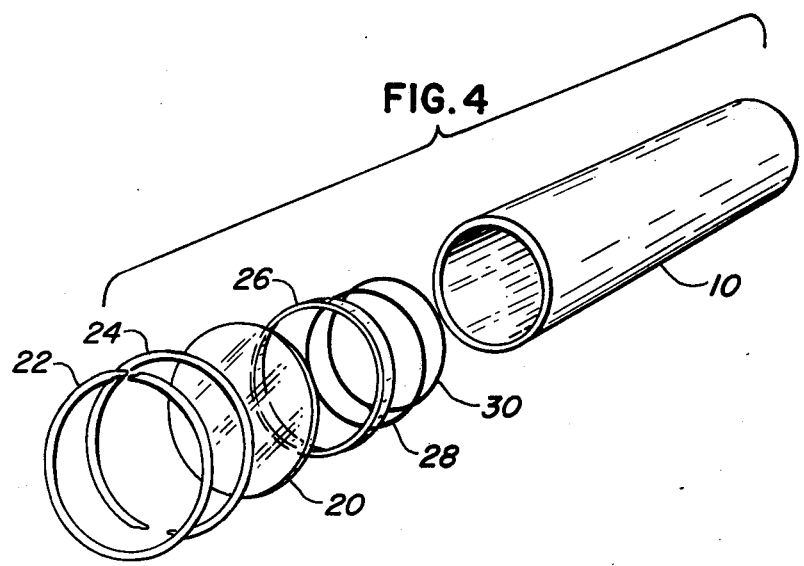
FIG. 4 is an exploded view of the camera housing showing the front end sealing elements.

The front end of the camera housing 10 and the sealing elements associated with lens window 20 may be more clearly seen in exploded view FIG. 4. Here it will be seen that instead of the usual externally threaded window retaining ring which is threaded into the housing to retain the window, there are instead two snap-rings 22 and 24. Snap-rings are more quickly removed, with a straight blade screwdriver being the only tool required, whereas threaded rings require tedious and time consuming effort to install and remove, and in addition require special spanner wrenches.

Immediately behind the window 20 is a seal ring retainer 26 which functions to properly locate the rectangular or square cross-sectioned sealing ring 28 and O-ring seal 30 within the barrel housing 10. Any suitable material may be used for the manufacture of seal retainer 26, such as for example plastic or corrosion-resistant metal such as brass, aluminum or stainless steel. For most applications black anodized aluminum is the preferred material. The two seal rings 28 and 30 may be made of any suitable elastomeric material such as rubber, butyl, or neoprene, and for certain environments nylon or teflon type plastics may be utilized. For most applications synthetic rubber such as butyl is preferred. The snap-rings 22 and 24 may be contructed of any suitable spring material such as bronze, steel, stainless steel, and beryllium copper.

Figure 5:
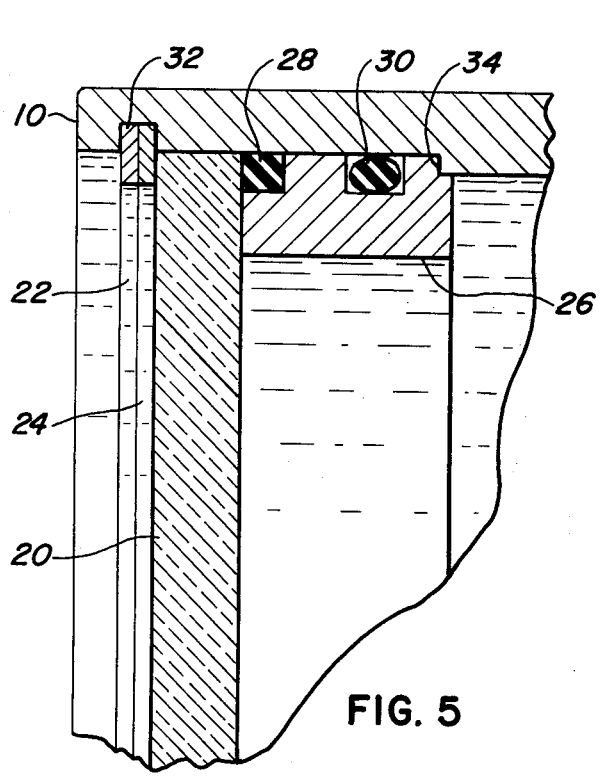
FIG. 5 is a cross-section view of the lens window and associated sealing elements taken through a plane indicated by section line 5—5 in FIG. 3.

FIG. 5 is a cross-section of the lens window 20 and camera housing 10 taken through a plane indicated by section line 5—5 in FIG. 3. First snap-ring 22 and second snap-ring 24 are fitted into groove 32 of housing 10 and bear against lens window 20 to prevent forward movement of the window. The window 20 bears against and compresses face seal 28 sufficiently to provide a seal. Seal retainer 26 is bottomed on shoulder 34 of the housing 10 to thereby retain window 20 in the opposite direction of retention afforded by snap-rings 22 and 24. O-ring seal 30 is retained in an O-ring groove in retainer 26 and provides a cylinder wall seal between housing 10 and retainer 26.

Figure 6:
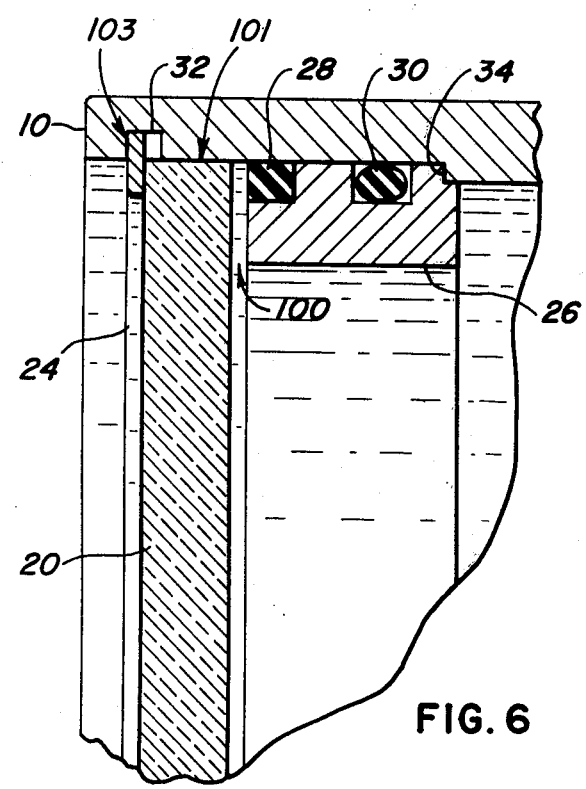
FIG. 6 is a cross-section view substantially the same as FIG. 5 except that the first snap-ring has been removed.

FIG. 6 is a view similar to FIG. 5 except that the first snap-ring 22 has been removed. Internal camera pressure has caused lens window 10 to move forward sufficiently for snap-ring 24 to bottom out on the foward edge of groove 32 to thereby retain window 20, and the window movement has unseated the seal 28 and provided a gas escape route 100, 101 and 103, between the face seal 28 and window 20. Gas then may escape around the outside edge of the lens window and past the snap-ring 24.

In an earlier embodiment of the invention the face seal 28 was an O-ring similar to seal 30. While this embodiment proved satisfactory the majority of times on some occasions the internal pressure was not dumped when the first snap-ring was removed. It was discovered that with certain sized O-rings, O-ring grooves, and snap-ring thicknesses; the face seal O-ring was not unseated when the first snap-ring was removed. In order to properly seal, the O-ring must be compressed into an eliptical cross-section between the window 20 and the back edge of the face seal groove in retainer 26. When the first snap-ring 22 was removed and the window 20 moved forward; the O-ring face seal would return to a round cross-section, and this excursion of the seal was approximately equal to the thickness of the first removed snap-ring 22 and was therefore sufficient to maintain a seal with the window. On other occasions it is believed that the O-ring rolled sufficiently to maintain a seal between the window and inside diameter of the housing 10.

Thus, the preferred embodiment of the present invention comprises a face seal 28 which is either rectangular or square in cross-section. Such a seal is compressed less in sealing and does not roll, and therefore is adaptable to a greater variety of combinations of seal sizes and snap ring thicknesses.

It should be further noted that under some pressure conditions, the rectangular seal 28 may be employed alone to obtain both the face sealing between window 20 and the retainer 26 and the cylinder sealing between the inside diameter of housing 10 and the outside diameter of the retainer 26; thus eliminating the need for the O-ring seal 30. It is well known that where dynamic sealing of a piston operating in a cylinder is required, elastomeric O-rings are usually superior to other shaped elastomeric seals. This is not necessarily true however for static seals such as used herein. In fact, if rectangular seal 28 is solely used, the retainer 26 may be eliminated and the shoulder 34 of housing 10 may be enlarged and moved forward to serve as the housing seat for rectangular seal 28.

It has been found that under some conditions the amount of excursion needed for sufficient compression of rectangular seal 28 to obtain both seal functions (face & cylinder) was great enouph to prevent total unseating of the seal when the first snap-ring was removed. Thus, while O-ring seal 30 may be eliminated with good results in some applications, the preferred embodiment includes the O-ring seal 30 and retainer 26, since they allow for a greater range of variables such as snap-ring thicknesses and seal sizes.

From the foregoing it may be seen that an improved sealing device and method for opening a sealed camera housing or similar container has been invented which provides a fast method for safely opening the container under conditions wherein positive internal pressure resides in the container because of inadvertence or other reasons hereinbefore described. Further, it should be clear from the foregoing that the figures and description herein have been drawn to a particular camera embodiment, but the invention is not to be restricted to the specific details, arrangement, materials, and number and shape of parts herein set forth, since various modifications may be effected for other container sealing requirements without departing from the spirit and scope of the invention.

Having described my invention, I now claim:

1. An improved camera container sealing device of the type in which the container is closed by a removable end plate, wherein the improvement comprises:
    a seal retainer disposed within said container in close proximity to the inner surface of said container and end plate;
    a substantially rectangular cross-section seal disposed between said end plate and said seal retainer;
    a snap-ring groove disposed in the wall of said container; and
    at least two snap-rings fitted within said groove to retain said end plate.

2. The container sealing device according to claim 1 further comprising a second seal of substantially circular cross-section disposed between said container and said retainer.

3. The sealing device according to claim 1 wherein said seal is substantially square.

4. An improved device for sealing a removable end plate to a camera container having a shoulder and an enlarged end opening for accepting said end plate, comprising:
- a seal adapted to fit within said enlarged end and seat on said shoulder and disposed between said shoulder and said end plate;
- a groove disposed in the wall of said container and located in proximity to the outer surface of said end plate; and
- at least two snap-rings fitted within said groove for retaining said end plate against said seal.

5. A method for sealing a camera container, which comprises the steps of:
- installing a first seal into said container;
- compressing the first seal with an end plate;
- inserting a first end plate retaining ring; and
- inserting a second end plate retaining ring.

6. The method according to claim 5 further comprising the steps of:
- placing a second seal over a seal retainer; and
- sliding the seal retainer into said container.

7. A method for opening a pressurized camera container having a removable end plate, which comprises the steps of:
- removing a first end plate retaining ring;
- unseating a seal between the container and end plate to permit internal pressure to escape;
- removing a second end plate retaining ring; and
- removing the end plate from the container.

8. A method for hermetically sealing and opening a container having a removable end plate, which comprises the steps of:
- mounting a first seal on a seal retainer;
- sliding the seal retainer into the container;
- installing a second seal in the container against the seal retainer;
- compressing the second seal with the end plate;
- inserting a first end plate retaining ring; and
- inserting a second end plate retaining ring.

9. The method according to claim 8 including the steps of:
- removing the second end plate retaining ring;
- unseating the second seal to permit pressure stabilization between the environment and the container;
- removing the first end plate retaining ring; and
- removing the end plate from the container.

* * * * *